US012680456B1

(12) United States Patent
Gambardella et al.

(10) Patent No.: US 12,680,456 B1
(45) Date of Patent: Jul. 14, 2026

(54) TURBINE BLADE FOR A GAS TURBINE ENGINE AND METHOD FOR FORMING SAME

(71) Applicant: RTX Corporation, Farmington, CT (US)

(72) Inventors: David E. Gambardella, Tucson, AZ (US); Jaime G. Ghigliotty Rosado, Cabo Rojo, PR (US); Benjamin B. Simpson, Rogersville, TN (US); Dominic J. Mongillo, Jr., West Hartford, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/077,834

(22) Filed: Mar. 12, 2025

(51) Int. Cl.
*F01D 5/18* (2006.01)

(52) U.S. Cl.
CPC .......... *F01D 5/186* (2013.01); *F05D 2230/10* (2013.01); *F05D 2240/306* (2013.01); *F05D 2240/307* (2013.01); *F05D 2260/202* (2013.01)

(58) Field of Classification Search
CPC ................. F01D 5/186; F05D 2230/10; F05D 2240/306; F05D 2240/307; F05D 2260/202
See application file for complete search history.

(56) References Cited

U.S. PATENT DOCUMENTS 4,529,357 A 7/1985 Holland
5,813,836 A * 9/1998 Starkweather .......... F01D 5/187 416/97 R
5,931,638 A 8/1999 Krause
7,704,045 B1 * 4/2010 Liang .......................... F01D 5/20 416/228
8,061,989 B1 11/2011 Liang
11,480,057 B2 10/2022 Jennings
12,140,043 B1 * 11/2024 Herbert ...................... F01D 5/20
2004/0197190 A1 * 10/2004 Stec ......................... F01D 5/141 416/97 R
2007/0237637 A1 * 10/2007 Lee ........................... F01D 5/20 416/97 R
2008/0131285 A1 6/2008 Albert
2009/0324422 A1 * 12/2009 Klasing ...................... F01D 5/20 416/233
2010/0129195 A1 5/2010 Surace
2014/0030102 A1 1/2014 Mishra
(Continued)

OTHER PUBLICATIONS

EP search report for EP26151421.0 dated May 13, 2026.

*Primary Examiner* — Aaron R Eastman
(74) *Attorney, Agent, or Firm* — Getz Balich LLC

(57) ABSTRACT

A blade for a gas turbine engine includes an airfoil body. The airfoil body includes a pressure side wall, a suction side wall, and a tip end wall. The tip end wall forms a blade tip. The airfoil body forms a plurality of suction side wall passages and a main body cavity. The suction side wall includes an exterior wall segment and an interior wall segment. The suction side wall forms the plurality of suction side wall passages between the exterior wall segment and the interior wall segment. The interior wall segment and the exterior wall segment extend to the tip end wall. The plurality of suction side wall passages extend through the tip end wall to the blade tip. The interior wall segment and the pressure side wall form the main body cavity.

14 Claims, 13 Drawing Sheets

(56) References Cited

U.S. PATENT DOCUMENTS

| | | | | |
|---|---|---|---|---|
| 2015/0118063 | A1* | 4/2015 | Lewis | F01D 5/186 416/223 R |
| 2015/0330228 | A1* | 11/2015 | Quach | F01D 5/147 416/1 |
| 2017/0002663 | A1* | 1/2017 | Quach | F01D 5/20 |
| 2017/0350255 | A1* | 12/2017 | Couture | F01D 5/20 |
| 2018/0156049 | A1* | 6/2018 | Clum | F01D 9/041 |
| 2018/0340426 | A1* | 11/2018 | Mongillo | F02C 3/04 |
| 2019/0376395 | A1* | 12/2019 | Place | F01D 5/20 |
| 2020/0080427 | A1* | 3/2020 | Mongillo | F01D 5/20 |
| 2020/0248565 | A1 | 8/2020 | Banks | |
| 2020/0408102 | A1 | 12/2020 | Propheter-Hinckley | |
| 2022/0025769 | A1* | 1/2022 | Place | B22C 9/103 |
| 2023/0045259 | A1* | 2/2023 | Place | F01D 5/20 |
| 2023/0139869 | A1* | 5/2023 | Prabhu | F01D 5/141 416/95 |
| 2023/0175405 | A1* | 6/2023 | Webster | F01D 5/087 415/1 |
| 2024/0018872 | A1* | 1/2024 | Ostino | B23P 15/04 |
| 2024/0035386 | A1* | 2/2024 | Jiang | F01D 5/18 |
| 2024/0133298 | A1* | 4/2024 | Williamson | F01D 5/20 |
| 2024/0301799 | A1 | 9/2024 | Spangler | |

* cited by examiner

TURBINE BLADE FOR A GAS TURBINE ENGINE AND METHOD FOR FORMING SAME

This invention was made with Government support under Contract N00019-21-G-0005/N00019-23-F-0019 awarded by the United States Navy. The Government has certain rights in this invention.

BACKGROUND

1. Technical Field

This disclosure relates generally to gas turbine engines for aircraft propulsion systems and, more particularly, to turbine blades for a turbine section of a gas turbine engine.

2. Background Information

A gas turbine engine typically includes a turbine section. The turbine section may include one or more turbines such as, but not limited to, a low-pressure turbine and a high-pressure turbine. These turbines may include multiple stages of blades and vanes. As fluid flows through the turbine section, the flow causes the blades to rotate about an axis of rotation. Temperatures within the turbine section may be relatively high, as the flow of fluid is received initially from a combustor of the gas turbine engine. Cooling air may be extracted from a compressor section of the gas turbine engine and used to cool the gas path components, for example, the blades of the turbines. Various turbine blade configurations are known in the art for mitigating the impact of high turbine section temperatures on turbine blade materials. While these known turbine blade configurations may be suitable for their intended purposes, there is always room in the art for improvement.

SUMMARY

According to an aspect of the present disclosure, a blade for a gas turbine engine includes an airfoil body configured for rotation about a rotational axis of the gas turbine engine. The airfoil body includes a pressure side wall, a suction side wall, and a tip end wall. The pressure side wall and the suction side wall extend between and to a leading edge of the airfoil body and a trailing edge of the airfoil body. The pressure side wall forms a pressure side surface. The suction side wall forms a suction side surface. The tip end wall forms a blade tip at an outer radial body end of the airfoil body. The airfoil body forms a plurality of suction side wall passages and a main body cavity. The suction side wall includes an exterior wall segment and an interior wall segment. The suction side wall forms the plurality of suction side wall passages between the exterior wall segment and the interior wall segment. The interior wall segment and the exterior wall segment extend radially to and contact the tip end wall. The plurality of suction side wall passages extend through the tip end wall to the blade tip. The interior wall segment and the pressure side wall form the main body cavity.

In any of the aspects or embodiments described above and herein, the main body cavity may be isolated from fluid communication with the suction side wall passages.

In any of the aspects or embodiments described above and herein, the tip end wall may form a tip pocket on the blade tip, and the plurality of suction side wall passages may be connected in fluid communication with the tip pocket.

In any of the aspects or embodiments described above and herein, the tip end wall may form a bottom wall and a perimeter side wall forming the tip pocket, the bottom wall may be disposed radially inward of the blade tip, the perimeter side wall may extend between and to the bottom wall and the blade tip, and the plurality of suction side wall passages may be formed through the bottom wall.

In any of the aspects or embodiments described above and herein, the plurality of suction side wall passages may be further formed through the perimeter side wall.

In any of the aspects or embodiments described above and herein, the pressure side wall, the interior wall segment, and the tip end wall may form a tip plenum extending along the tip end wall, and the tip plenum may be disposed radially outward of and connected in fluid communication with the main body cavity.

In any of the aspects or embodiments described above and herein, the tip end wall may form a squealer pocket on the blade tip, and the squealer pocket may be connected in fluid communication with the tip plenum.

In any of the aspects or embodiments described above and herein, the squealer pocket may be coincident with the tip pocket.

In any of the aspects or embodiments described above and herein, the tip plenum may extend along the tip end wall to an outlet formed through the trailing edge.

In any of the aspects or embodiments described above and herein, the pressure side wall may include an exterior pressure wall segment and an interior pressure wall segment, the pressure side wall may form a plurality of pressure side wall passages between the exterior pressure wall segment and the interior pressure wall segment, the tip plenum may be separated from the pressure side wall passages by the interior pressure wall segment, and the tip plenum may be disposed radially outward of the pressure side wall passages.

In any of the aspects or embodiments described above and herein, the exterior wall segment may form a plurality of cooling holes extending through exterior wall segment from the suction side wall passages to the suction side surface.

According to another aspect of the present disclosure, a method for forming a blade for a gas turbine engine includes assembling a core assembly including at least a suction side skin core, forming an airfoil body around the core assembly by applying a metallic casting stock onto the core assembly, the suction side skin core forming a plurality of suction side wall passages within the airfoil body, machining the metallic casting stock, the machining including forming a blade tip of the airfoil body, a top portion of the suction side skin core extending through the blade tip outside the airfoil body, and removing the core assembly from the airfoil body forming the airfoil body with the airfoil body including a pressure side wall, a suction side wall, and a tip end wall, the pressure side wall and the suction side wall extending between and to a leading edge of the airfoil body and a trailing edge of the airfoil body, the tip end wall forming the blade tip, the plurality of suction side wall passages disposed within the pressure side wall and extending through the blade tip.

In any of the aspects or embodiments described above and herein, machining the metallic casting stock may include machining the tip end wall to form a tip pocket on the blade tip, and the tip pocket may be connected in fluid communication with the plurality of suction side wall passages.

In any of the aspects or embodiments described above and herein, the tip end wall may form a bottom wall and a perimeter side wall forming the tip pocket, the bottom wall may be disposed radially inward of the blade tip, the perimeter side wall may extend between and to the bottom wall and the blade tip, and the plurality of suction side wall passages may be formed through the bottom wall.

In any of the aspects or embodiments described above and herein, the plurality of suction side wall passages may be further formed through the perimeter side wall.

According to another aspect of the present disclosure, a gas turbine engine includes a turbine section including a bladed turbine rotor mounted for rotation about a rotational axis. The bladed turbine rotor includes a plurality of turbine blades. Each of the turbine blades includes an airfoil body. The airfoil body includes a pressure side wall, a suction side wall, and a tip end wall. The pressure side wall and the suction side wall extend between and to a leading edge of the airfoil body and a trailing edge of the airfoil body. The pressure side wall forms a pressure side surface. The suction side wall forms a suction side surface. The tip end wall forms a blade tip at an outer radial body end of the airfoil body. The airfoil body forms a plurality of suction side wall passages, a plurality of pressure side wall passages, and a tip plenum. The suction side wall includes an exterior suction wall segment and an interior suction wall segment. The suction side wall forms the plurality of suction side wall passages between the exterior suction wall segment and the interior suction wall segment. The interior suction wall segment and the exterior suction wall segment extend radially to and contact the tip end wall. The plurality of suction side wall passages extend through the tip end wall to the blade tip. The pressure side wall includes an exterior pressure wall segment and an interior pressure wall segment. The pressure side wall forms the plurality of pressure side wall passages between the exterior pressure wall segment and the interior pressure wall segment. The interior pressure wall segment forms an outer radial passage end of the plurality of pressure side wall passages radially inward of the blade tip. The pressure side wall, the suction side wall, and the tip end wall form the tip plenum extending along the tip end wall. The tip plenum is disposed radially between the plurality of pressure side wall passages and the tip end wall.

In any of the aspects or embodiments described above and herein, the tip end wall may form a tip pocket on the blade tip, and the plurality of suction side wall passages may be connected in fluid communication with the tip pocket.

In any of the aspects or embodiments described above and herein, the tip end wall may form a bottom wall and a perimeter side wall forming the tip pocket, the bottom wall may be disposed radially inward of the blade tip, the perimeter side wall may extend between and to the bottom wall and the blade tip, and the plurality of suction side wall passages may be formed through the bottom wall.

In any of the aspects or embodiments described above and herein, the plurality of suction side wall passages may be further formed through the perimeter side wall.

In any of the aspects or embodiments described above and herein, the tip end wall may form a squealer pocket on the blade tip, and the squealer pocket may be connected in fluid communication with the tip plenum.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
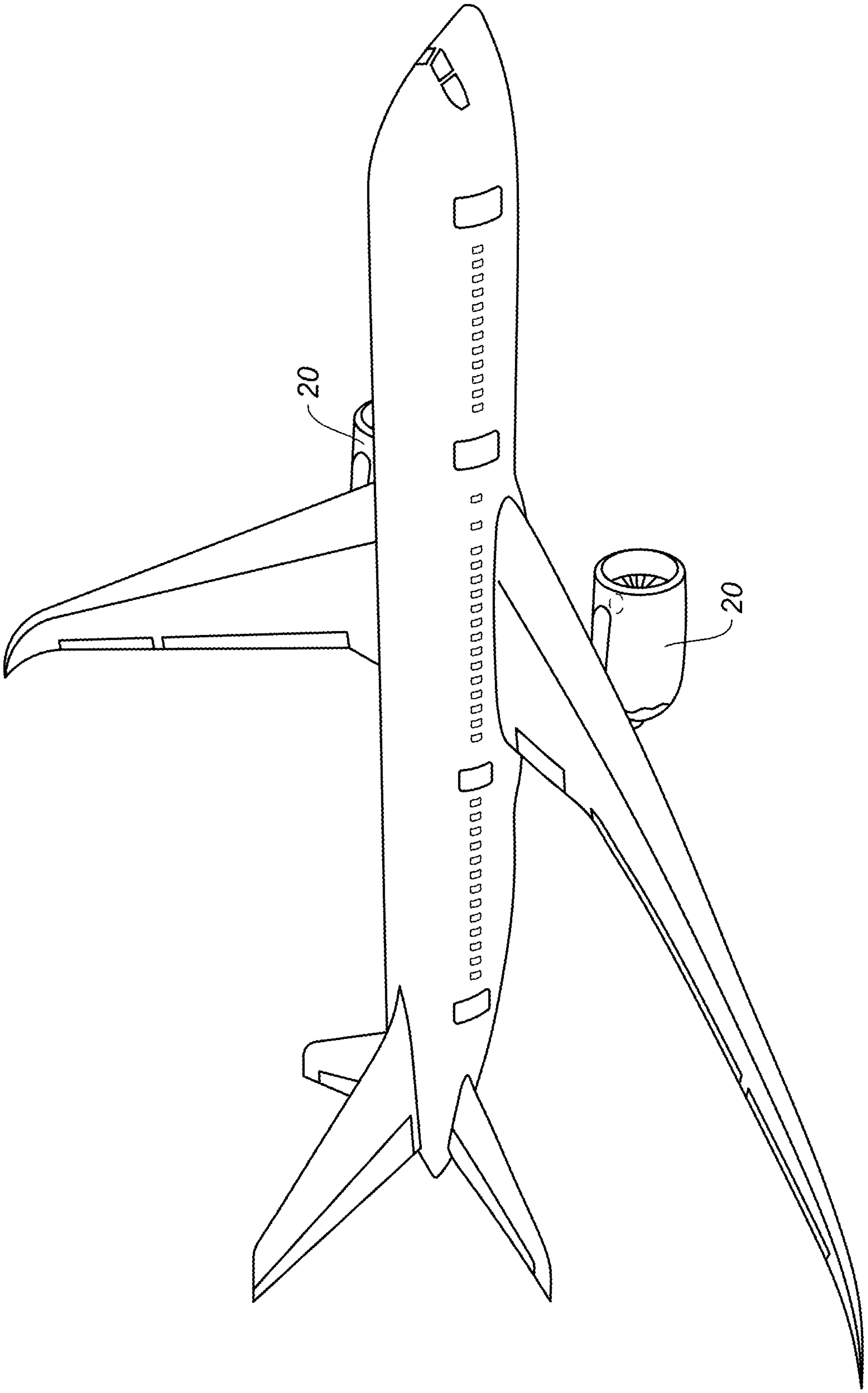
FIG. 1 illustrates an aircraft including propulsion systems, in accordance with one or more embodiments of the present disclosure.

FIG. 1 illustrates a propulsion system 20 for an aircraft. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone).

Figure 2:
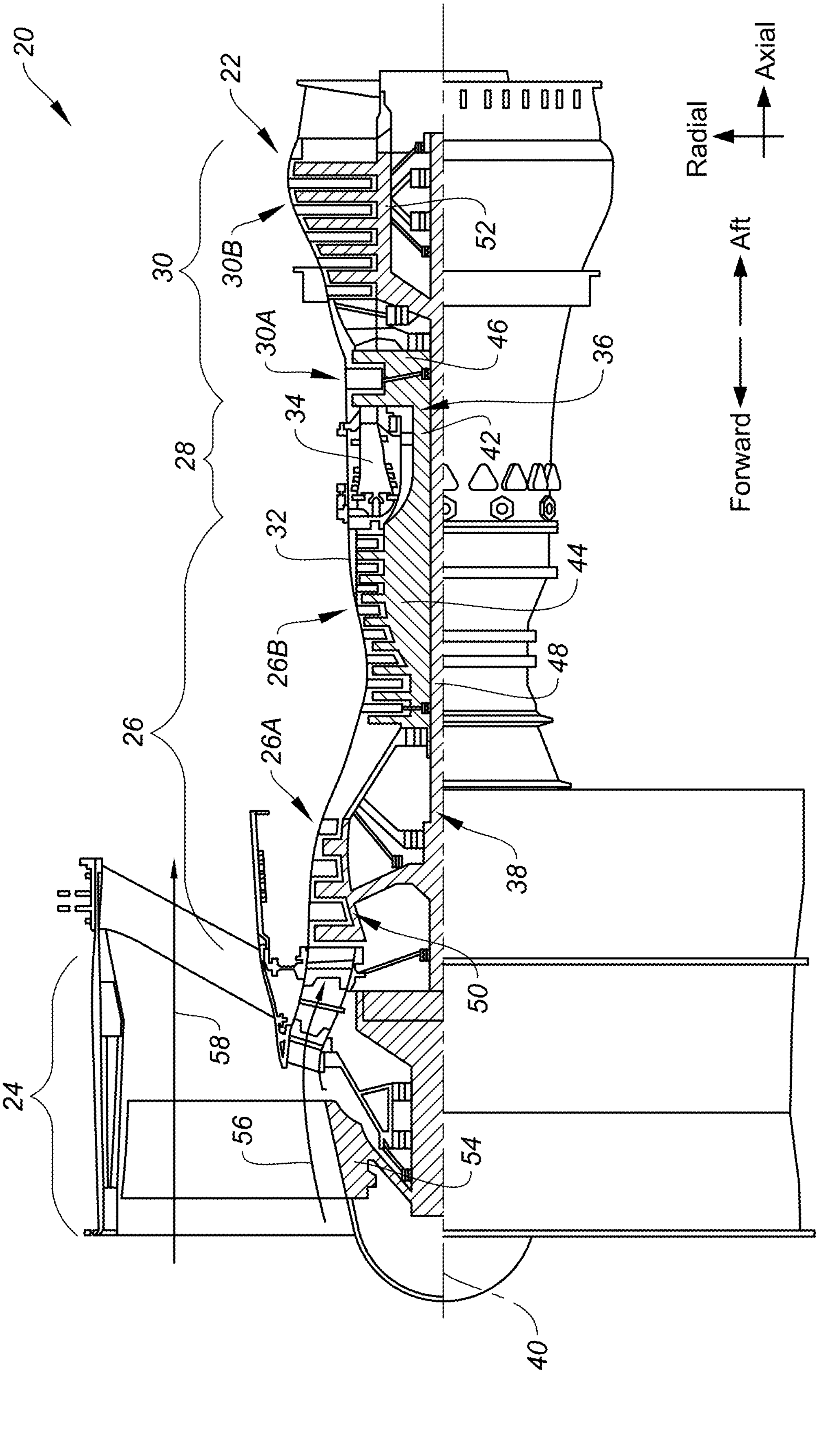
FIG. 2 schematically illustrates a cutaway, side view of an aircraft propulsion system including a gas turbine engine, in accordance with one or more embodiments of the present disclosure.

FIG. 2 schematically illustrates a cutaway, side view of the propulsion system 20. The propulsion system 20 includes a gas turbine engine 22. The gas turbine engine 22 of FIG. 2 is configured as a multi-spool turbofan gas turbine engine. However, while the following description and accompanying drawings may refer to the turbofan gas turbine engine of FIG. 2 as an example, it should be understood that aspects of the present disclosure may be equally applicable to other types of gas turbine engines including, but not limited to, a turboshaft gas turbine engine, a turboprop gas turbine engine, a turbojet gas turbine engine, a propfan gas turbine engine, or an open rotor gas turbine engine.

The gas turbine engine 22 of FIG. 2 includes a fan section 24, a compressor section 26, a combustor section 28, a turbine section 30, and an engine static structure 32. The compressor section 26 includes a low-pressure compressor (LPC) 26A and a high-pressure compressor (HPC) 26B. The combustor section 28 includes a combustor 34 (e.g., an annular combustor). The turbine section 30 includes a high-pressure turbine (HPT) 30A and a low-pressure turbine (LPT) 32B.

Components of the fan section 24, the compressor section 26, and the turbine section 30 form a first rotational assembly 36 (e.g., a high-pressure spool) and a second rotational assembly 38 (e.g., a low-pressure spool) of the gas turbine engine 22. The first rotational assembly 36 and the second rotational assembly 38 are mounted for rotation about a rotational axis 40 (e.g., an axial centerline) of the gas turbine engine 22 relative to the engine static structure 32.

The first rotational assembly 36 includes a first shaft 42, a bladed first compressor rotor 44 for the high-pressure compressor 26B, and a bladed first turbine rotor 46 for the high-pressure turbine 30A. The first shaft 42 interconnects the bladed first compressor rotor 44 and the bladed first turbine rotor 46.

The second rotational assembly 38 includes a second shaft 48, a bladed second compressor rotor 50 for the low-pressure compressor 26A, a bladed second turbine rotor 52 for the low-pressure turbine 30B, and a bladed fan rotor 54 for the fan section 24. The second shaft 48 of FIG. 2 interconnects the bladed second compressor rotor 50, the bladed second turbine rotor 52, and the bladed fan rotor 54. The bladed fan rotor 54 may alternatively be connected to the second shaft 48 by a gear train (e.g., a reduction gear assembly) configured to drive rotation of the bladed fan rotor 54 at a different rotational speed than the second shaft 48. The first shaft 42 and the second shaft 48 are concentric and configured to rotate about the rotational axis 40. The present disclosure, however, is not limited to concentric configurations of the first shaft 42 and the second shaft 48.

The engine static structure 32 may include one or more engine cases, cowlings, bearing assemblies, and/or other non-rotating structures configured to house and/or support (e.g., rotationally support) components of the gas turbine engine 22 sections 24, 26, 28, 30.

In operation of the gas turbine engine 22 of FIG. 2, ambient air is directed through the fan section 24 and into a core flow path 56 (e.g., an annular flow path) and a bypass flow path 58 (e.g., an annular flow path) facilitated by rotation of the bladed fan rotor 54. Airflow along the core flow path 56 is compressed by the low-pressure compressor 26A and the high-pressure compressor 26B, mixed and burned with fuel in the combustor 34, and then directed through the high-pressure turbine 30A and the low-pressure turbine 30B. The bladed first turbine rotor 46 and the bladed second turbine rotor 52 rotationally drive the first rotational assembly 36 and the second rotational assembly 38, respectively, in response to the combustion gas flow through the high-pressure turbine 30A and the low-pressure turbine 30B. The bypass flow path 58 may be disposed outside the engine static structure 32. For example, the engine static structure 32 and an outer aircraft propulsion system housing (e.g., a nacelle) may form an annular bypass duct radially therebetween, and airflow may be directed through the annular bypass duct along the bypass flow path 58.

Figure 3:
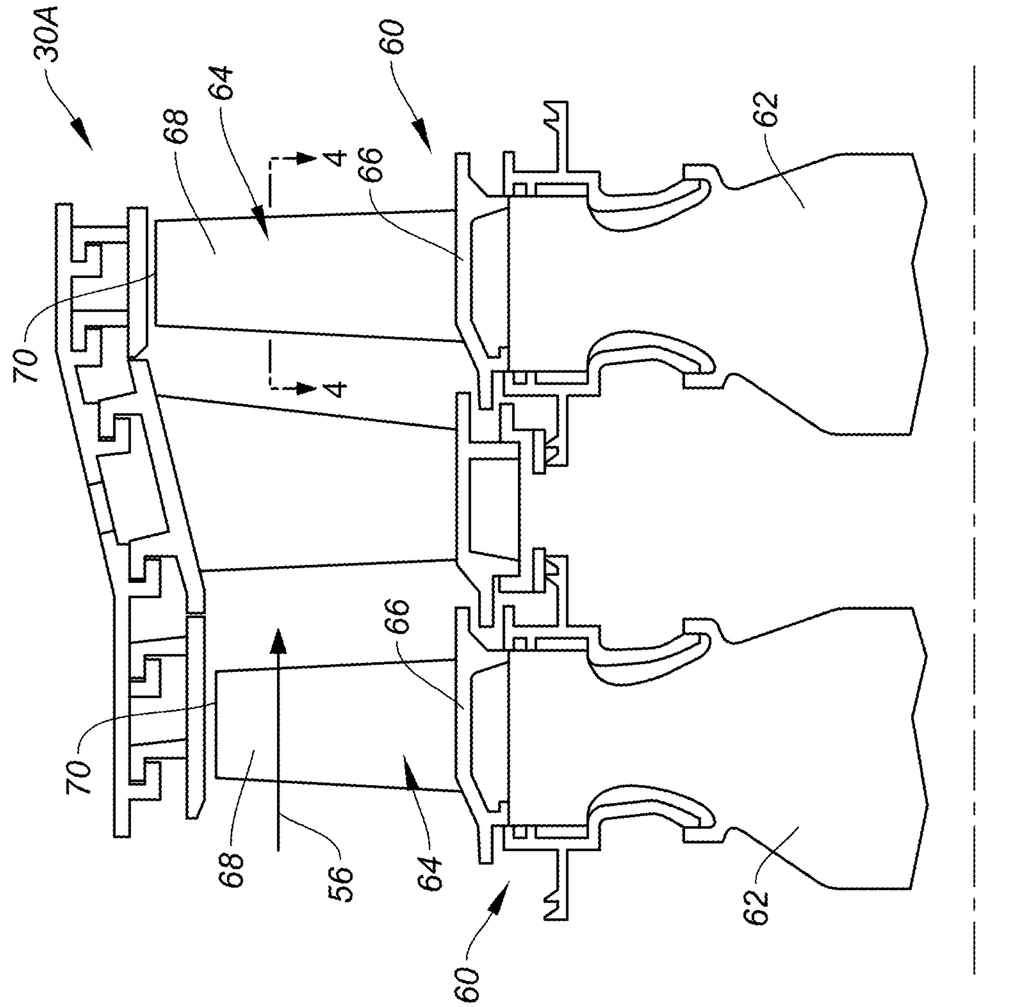
FIG. 3 schematically illustrates a cutaway, side view of a portion of a turbine section of the gas turbine engine, in accordance with one or more embodiments of the present disclosure.

FIG. 3 schematically illustrates a cutaway, side view of a portion of the high-pressure turbine section 30A showing the core flow path 56 and a portion of the bladed first turbine rotor 46. While aspects of the present disclosure will be explained with respect to the high-pressure turbine section 30A and the bladed first turbine rotor 46, the present disclosure is not limited in applicability to a high-pressure turbine section of a gas turbine engine. The bladed first turbine rotor 46 includes one or more rotor stages 60 (e.g., axially arrayed rotor stages). Each of the rotor stages 60 includes a rotor disk 62 and a plurality of turbine blades 64 disposed on and circumferentially distributed about the rotor disk 62. Each of the turbine blades 64 includes a platform 66 and an airfoil body 68. The platform 66 forms an inner radial boundary of the core flow path 56. The airfoil body 68 extends radially outward from the platform 66 to a blade tip 70 (e.g., in a spanwise direction) of the respective one of the turbine blades 64.

Figure 4:
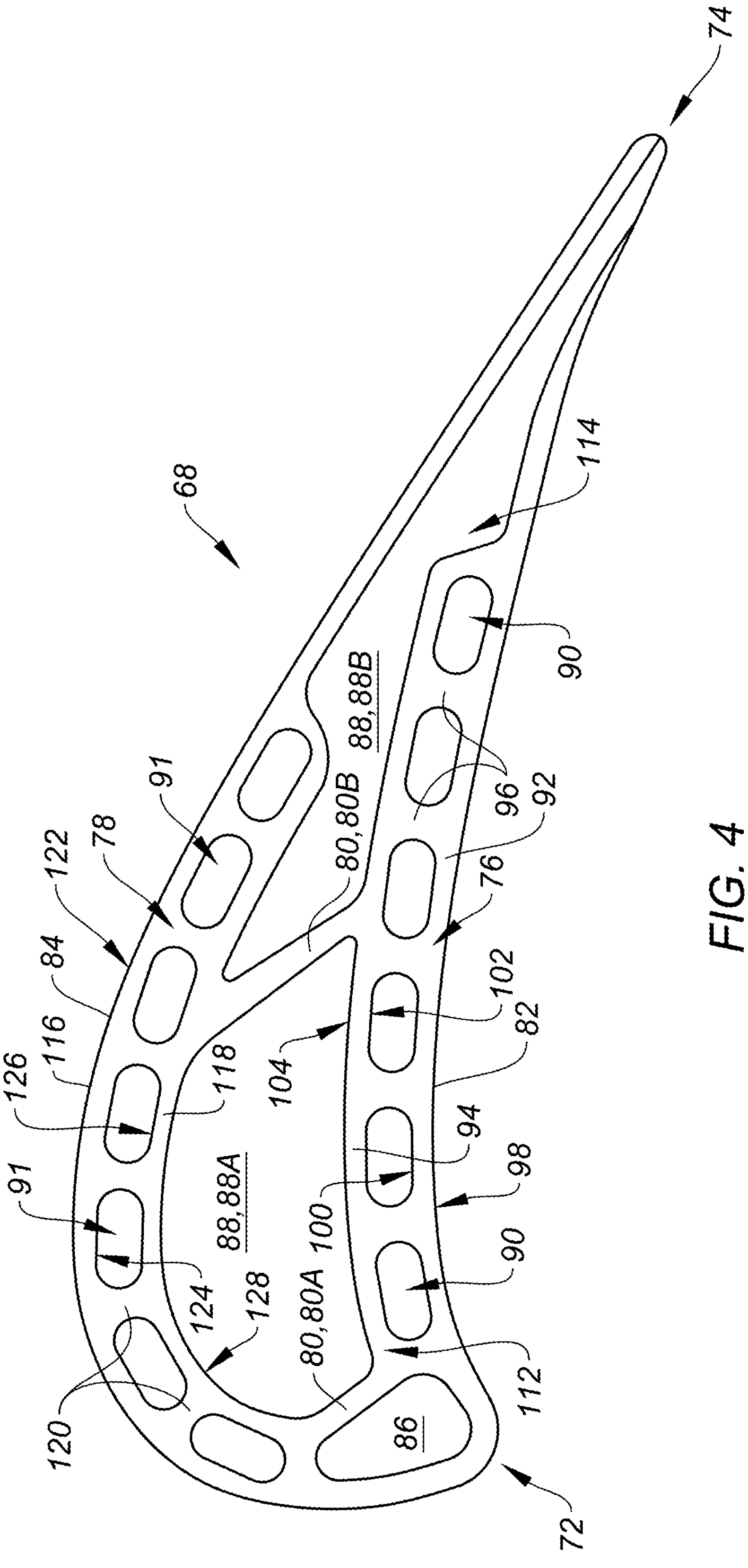
FIG. 4 illustrates a cross-sectional view of a turbine blade of the turbine section taken along Line 4-4 of FIG. 3, in accordance with one or more embodiments of the present disclosure.

FIG. 4 illustrates the airfoil body 68 taken along Line 4-4 of FIG. 3. The airfoil body 68 extends (e.g., in a chordwise direction) between and to a leading edge 72 of the airfoil body 68 and a trailing edge 74 of the airfoil body 68. The airfoil body 68 includes a pressure side wall 76, a suction side wall 78, and one or more ribs 80. The pressure side wall 76 and the suction side wall 78 extend between and to the leading edge 72 and the trailing edge 74. The leading edge 72, the trailing edge 74, the pressure side wall 76, and the suction side wall 78 may extend between and to the platform 66 and the blade tip 70. The pressure side wall 76 forms a pressure side surface 82 (e.g., an exterior surface) of the airfoil body 68. The suction side wall 78 forms a suction side surface 84 (e.g., an exterior surface) of the airfoil body 68. The ribs 80 extend between and connect the pressure side wall 76 and the suction side wall 78. The airfoil body 68 (e.g., the pressure side wall 76, the suction side wall 78, and the ribs 80) form a plurality of internal cavities which include a leading edge cavity 86, one or more main body cavities 88, a plurality of pressure side wall passages 90, and a plurality of suction side wall passages 91. The airfoil body 68 may form a single main body cavity 88 or, as shown in FIG. 4 for example, at least two main body cavities 88 including a first main body cavity 88A and a second main body cavity 88B. These cavities 86, 88 and passages 90, 91 supplied with cooling air (e.g., compressor bleed air) at an inner radial end of the airfoil body 68.

Figure 5:
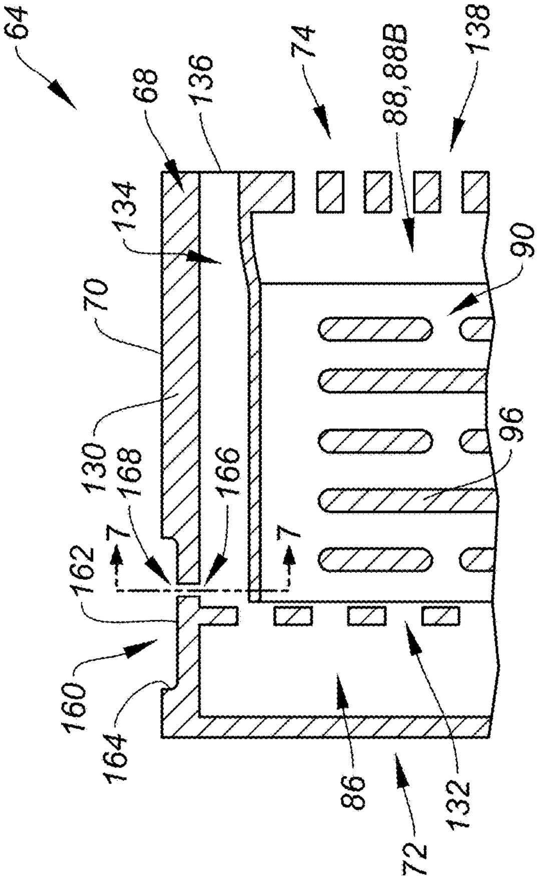
FIG. 5 illustrates a cutaway, side view of the turbine blade, in accordance with one or more embodiments of the present disclosure.
Figure 6:
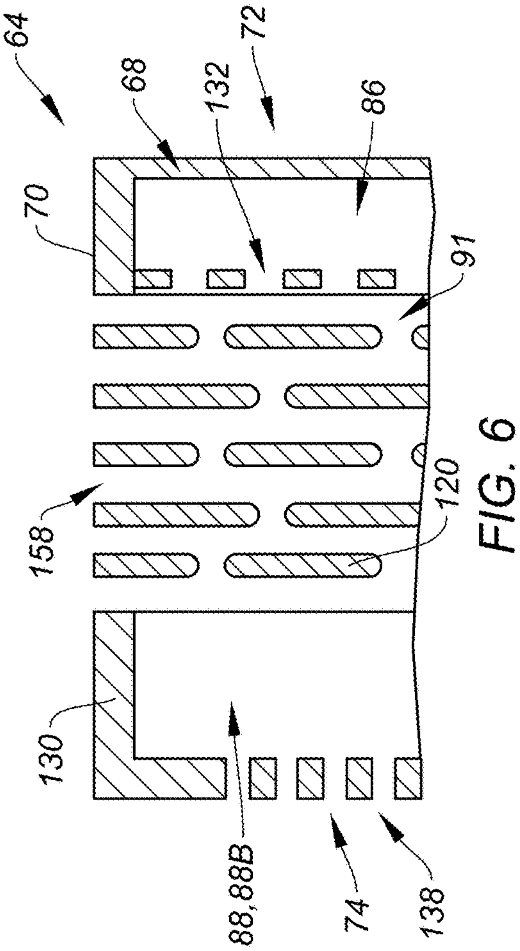
FIG. 6 illustrates another cutaway, side view of the turbine blade, in accordance with one or more embodiments of the present disclosure.
Figure 7:
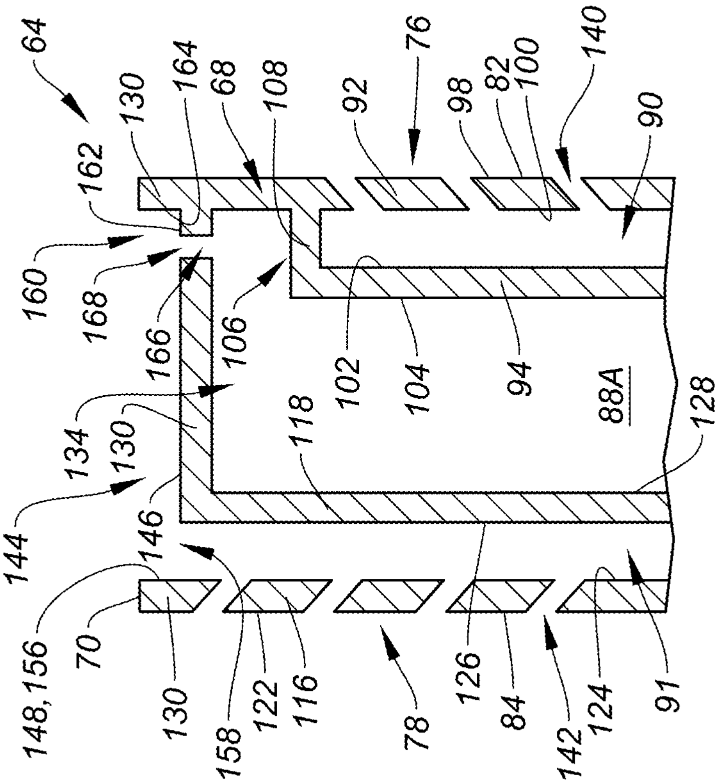
FIG. 7 illustrates a cross-sectional view of a portion of the turbine blade taken along Line 7-7 of FIG. 5, in accordance with one or more embodiments of the present disclosure.
Figure 8:
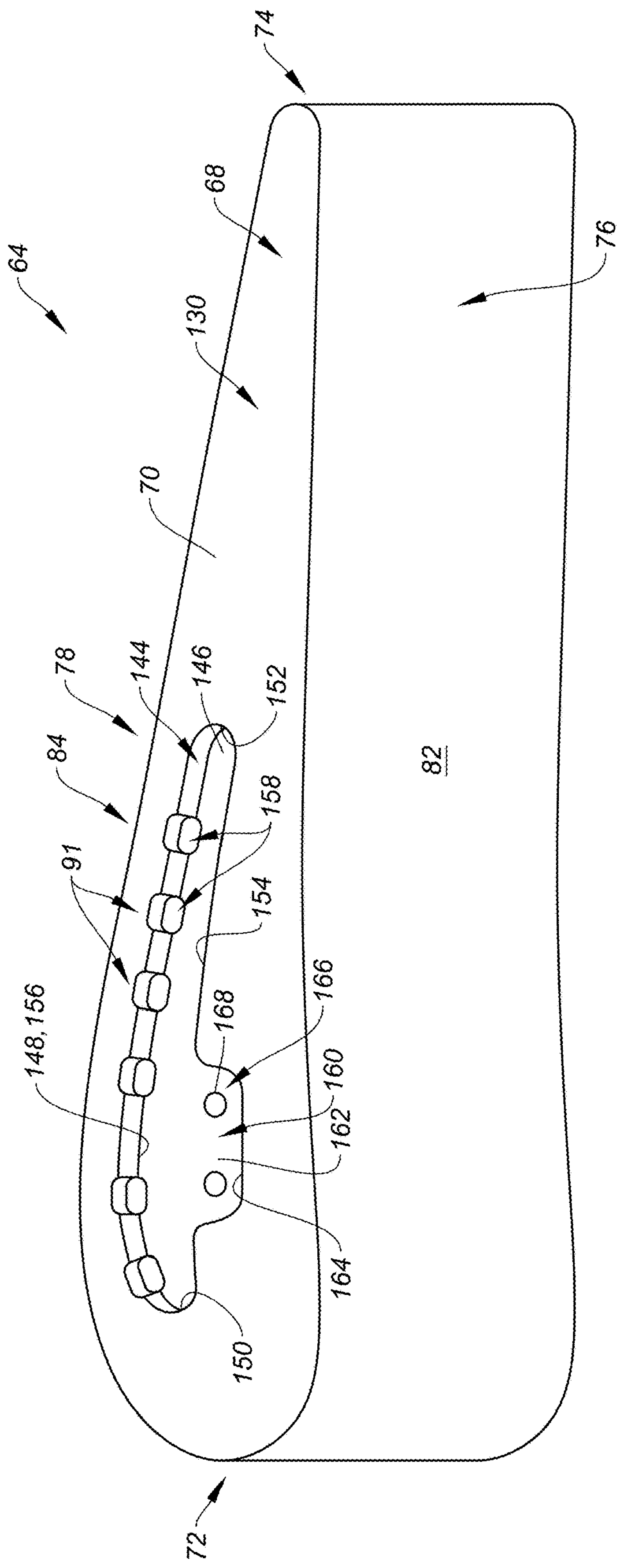
FIG. 8 illustrates a perspective view of a blade tip of the turbine blade, in accordance with one or more embodiments of the present disclosure.

With additional reference to FIGS. 5-8, the airfoil body 68 is shown in greater detail. FIG. 5 illustrates a cutaway, side view of the airfoil body 68 showing the pressure side wall passages 90. FIG. 6 illustrates another cutaway, side view of the airfoil body 68 showing the suction side wall passages 91. FIG. 7 illustrates a cross-sectional view of the airfoil body 68 taken along Line 7-7 of FIG. 5. FIG. 8 illustrates a top, perspective view of the airfoil body 68 showing the blade tip 70.

The pressure side wall 76 includes an exterior wall segment 92, an interior wall segment 94, and a plurality of ribs 96. The exterior wall segment 92 extends between and to an outer side 98 of the exterior wall segment 92 and an inner side 100 of the exterior wall segment 92. The exterior wall segment 92 extends radially outward (e.g., from the platform 66) to and contacts a tip end wall 130 of the airfoil body 68 forming the blade tip 70. The outer side 98 forms the pressure side surface 82. The interior wall segment 94 extends between and to an outer side 102 of the interior wall segment 94 and an inner side 104 of the interior wall segment 94. The inner side 104 forms portions of the main body cavities 88. As shown in FIG. 7, the interior wall segment 94 extends radially along the exterior wall segment 92 to an outer radial end 106 of the interior wall segment 94 disposed radially inward of the tip end wall 130. The interior wall segment 94 contacts the exterior wall segment 92 (e.g., the inner side 100) at (e.g., on, adjacent, or proximate) the outer radial end 106. The interior wall segment 94 forms a rim 108 at (e.g., on, adjacent, or proximate) the outer radial end 106. The ribs 96 extend lengthwise (e.g., continuously or segmented) between and connect the exterior wall segment 92 (e.g., the inner side 100) and the interior wall segment 94 (e.g., the outer side 102). The ribs 96 are oriented lengthwise primarily in the radial direction.

The exterior wall segment 92, the interior wall segment 94, and the ribs 96 form the pressure side wall passages 90. The pressure side wall passages 90 are formed by and between the exterior wall segment 92 (e.g., the inner side 100) and the interior wall segment 94 (e.g., the outer side 102). The ribs 96 are disposed between and separate the pressure side wall passages 90 (e.g., adjacent pressure side wall passages 90). The ribs 96 may be segmented (e.g., discontinuous) in the radial direction, as shown in FIG. 5, to facilitate fluid communication between the pressure side wall passages 90. The pressure side wall passages 90 extend radially from an inner radial end of the airfoil body 68 to the outer radial end 106 (e.g., the rim 108) which forms an outer radial end of the pressure side wall passages 90. The exterior wall segment 92 forms a plurality of pressure side cooling holes 140 extending through the exterior wall segment 92 from the pressure side wall passages 90 to the pressure side surface 82. The pressure side wall passages 90 are isolated from fluid communication with the main body cavities 88 through the airfoil body 68.

The suction side wall 78 includes an exterior wall segment 116, an interior wall segment 118, and a plurality of ribs 120. The exterior wall segment 116 extends between and to an outer side 122 of the exterior wall segment 116 and an inner side 124 of the exterior wall segment 116. The outer side 122 forms the suction side surface 84. The interior wall segment 118 extends between and to an outer side 126 of the interior wall segment 118 and an inner side 128 of the interior wall segment 118. The inner side 128 forms portions of the main body cavities 88. As shown in FIG. 7, the exterior wall segment 116 and the interior wall segment 118 extend radially outward to and contact the tip end wall 130. The ribs 120 extend between and connect the exterior wall segment 116 (e.g., the inner side 124) and the interior wall segment 118 (e.g., the outer side 126). Similar to the ribs 96, the ribs 120 may be oriented lengthwise primarily in the radial direction. The exterior wall segment 116, the interior wall segment 118, and the ribs 120 form the suction side wall passages 91. The suction side wall passages 91 are formed by and between the exterior wall segment 116 (e.g., the inner side 124) and the interior wall segment 118 (e.g., the outer side 126). The ribs 120 are disposed between and separate the suction side wall passages 91 (e.g., adjacent suction side wall passages 91). Similar to the ribs 96, the ribs 120 may be segmented (e.g., discontinuous) in the radial direction to facilitate fluid communication between the suction side wall passages 91. The suction side wall passages 91 extend radially from an inner radial end of the airfoil body 68 through the tip end wall 130 to the blade tip 70. The exterior wall segment 116 forms a plurality of suction side cooling holes 142 extending through the exterior wall segment 116 from the suction side wall passages 91 to the suction side surface 84. The suction side wall passages 91 are isolated from fluid communication with the main body cavities 88 through the airfoil body 68.

The first main body cavity 88A is formed by and between the ribs 80, the interior wall segment 94 (e.g., the inner side 104), and the interior wall segment 118 (e.g., the inner side 128). In particular, the first main body cavity 88A may be formed between a first rib 80A of the ribs 80 and a second rib 80B of the ribs 80. The first main body cavity 88A may be separated from the second main body cavity 88B by the second rib 80B. The first rib 80A may form a plurality of passages 132 connecting the first main body cavity 88A in fluid communication with the leading edge cavity 86. The first main body cavity 88A extends radially from an inner radial end of the airfoil body 68 to the tip end wall 130. The first main body cavity 88A extends to and is connected in fluid communication with a tip plenum 134 (or a "tip flag") at an outer radial end of the body cavity 88A and/or the body cavities 88. The airfoil body 68 forms the tip plenum 134 extending along the tip end wall 130 from at least the first rib 80A to the trailing edge 74. The tip plenum 134 is disposed radially between the tip end wall 130 and the pressure side wall passages 90 and the second main body cavity 88B. For example, as shown in FIG. 7, the tip plenum 134 may be disposed radially outward of and separated from the pressure side wall passages 90 by the rim 108, which rim 108 further forms the tip plenum 134. The tip plenum 134 may include an outlet 136 formed by the airfoil body 68 through the trailing edge 74. The tip plenum 134 may additionally be connected in fluid communication with the leading edge cavity 86 and/or the second main body cavity 88B.

The second main body cavity 88B may be formed by and between the ribs pressure side wall 76, the suction side wall 78, and the ribs 80 (e.g., the second rib 80B). The second main body cavity 88B may extend between and to the second rib 80B and the trailing edge 74. The airfoil body 68 may form a plurality of trailing edge cooling holes 138 of the second main body cavity 88B at (e.g., on, adjacent, or proximate) the trailing edge 74. The trailing edge cooling holes 138 may be arrayed radially along the trailing edge 74.

Referring to FIGS. 7 and 8, the tip end wall 130 forms a tip pocket 144 on the blade tip 70. The tip end wall 130 forms a bottom wall 146 and a perimeter side wall 148 forming the tip pocket 144. The bottom wall 146 is recessed from (e.g., disposed radially inward of) the blade tip 70. The perimeter side wall 148 extends between and to the blade tip 70 and the bottom wall 146. The perimeter side wall 148 circumscribes the tip pocket 144. The tip pocket 144 is disposed between (e.g., spaced from) the pressure side surface 82 and the suction side surface 84. Similarly, the tip pocket 144 is disposed between (e.g., spaced from) the leading edge 72 and the trailing edge 74. The perimeter side wall 148 extends between and to a leading end 150 of the perimeter side wall 148 and a trailing end 152 of the perimeter side wall 148. The perimeter side wall 148 includes a pressure side 154 and a suction side 156 each extending between and to the leading end 150 and the trailing end 152. The suction side wall passages 91 (e.g., each of the suction side wall passages 91) is connected in fluid communication with the tip pocket 144. For example, the tip end wall 130 of FIG. 8 forms an outlet 158 of each of the suction side wall passages 91 on the tip pocket 144. The outlet 158 may be formed by both of the bottom wall 146 and the suction side 156. For example, a portion of the outlet 158 may extend through (e.g., radially through) the tip end wall 130 on the perimeter side wall 148 (e.g., the suction side 156) such that the outlet 158 interrupts the perimeter side wall 148. Alternatively, the outlet 158 may be formed entirely by the bottom wall 146.

The tip end wall 130 may additionally form a squealer pocket 160 on the blade tip 70. In particular, the tip end wall 130 forms a bottom wall 162 and a side wall 164 of the squealer pocket 160. The bottom wall 162 is recessed from (e.g., disposed radially inward of) the blade tip 70. The side wall 164 may extend between and to the blade tip 70 and the bottom wall 162. The squealer pocket 160 may be disposed coincident with the tip pocket 144 as shown in FIGS. 7 and 8. For example, the side wall 164 may extend from and interrupt the perimeter side wall 148 (e.g., the pressure side 154). The side wall 164 may extend from the pressure side 154 toward the pressure side wall 76 forming the squealer pocket 160. Alternatively, the squealer pocket 160 may be discrete from the tip pocket 144 such that the squealer pocket 160 and the tip pocket 144 are separated from one another by the tip end wall 130. The squealer pocket 160 is connected in fluid communication with the tip plenum 134. For example, the tip end wall 130 may form one or more air passages 166 extending between and to the tip plenum 134 and the squealer pocket 160 (e.g., the bottom wall 162). The bottom wall 162 forms an outlet 168 for each of the air passages 166 on the squealer pocket 160.

The airfoil body 68 directs cooling air from the suction side wall passages 91 (e.g., the outlets 158) to the tip pocket 144. The airfoil body 68 further directs cooling air from the tip plenum 134 to the squealer pocket 160 through the air passages 166. The cooling air flow supplied to the tip pocket 144 and the squealer pocket 160 facilitates cooling of the airfoil body 68 proximate the blade tip 70. The radial orientation (e.g., substantially straight orientation) of the suction side wall passages 91 through the tip end wall 130 to the outlets 158 may also facilitate improved cooling air flow (e.g., reduced pressure loss) from internal to external airfoil body 68 surfaces while increasing local suction side convective heat transfer within the suction side wall passages 91 and increasing thermal cooling effectiveness adjacent exterior wall segment 116. While described herein for the suction side wall passages 91, other internal passages formed by the airfoil body 68, including the leading edge cavity 86, the main body cavities 88, and/or the pressure side wall passages 90, may additionally or alternatively be formed extending through the tip end wall 130 to the blade tip 70 and/or the tip pocket 144. As will be discussed in further detail, the configuration of the suction side wall passages 91 may additionally facilitate improvements in turbine blade 64 (e.g., the airfoil body 68) manufacturing, casting, and/or machining, compared to at least some conventional turbine blade designs. For example, at least some conventional airfoil body designs include internal passages which terminate below the machined blade tip of the airfoil body. Subsequent machining operations are then performed on the airfoil body to create air flow features which direct air flow from these internal passages to the blade tip. However, the tolerance stack up between sequential casting and machining operations may preclude formation of smooth transitions between internal passages and the blade tip, and this resulting mismatch reduces cooling effectiveness.

Figure 9:
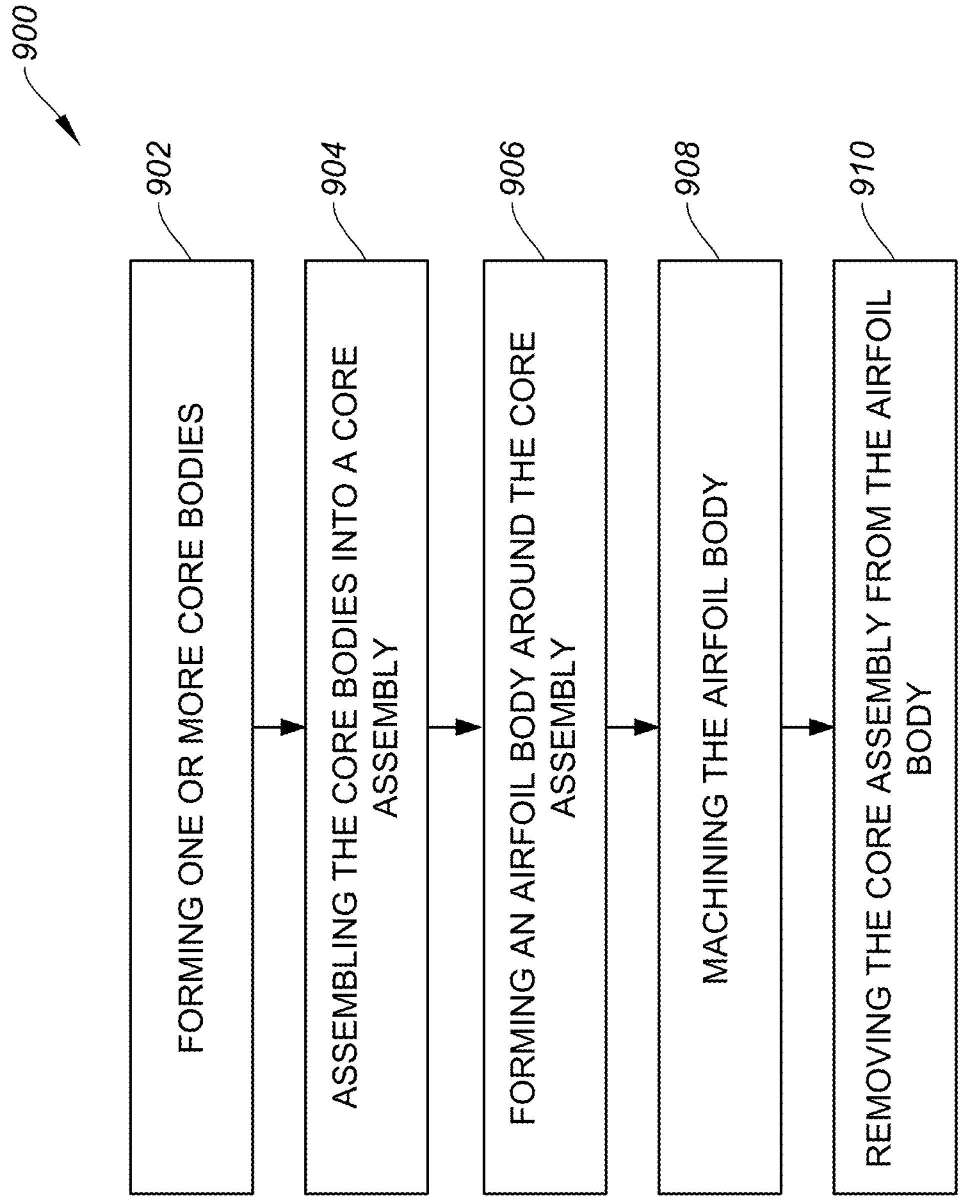
FIG. 9 illustrates a block diagram depicting a method for forming an airfoil body of a blade for a gas turbine engine, in accordance with one or more embodiments of the present disclosure.

Referring to FIG. 9, a method 900 for forming an airfoil body of a blade (e.g., a turbine blade or other rotor blade) for a gas turbine engine. FIG. 9 illustrates a flowchart for the method 900. The method 900 will be described herein with respect to the turbine blades 64. However, it should be understood that the method 900 is not limited to use with the particular turbine blades 64 described herein. For example, aspects of the method 900 may be equally applicable to other turbine blade configurations, to rotor blades configured for use outside of a turbine (e.g., compressor blades), or for other gas turbine engine components. Unless otherwise noted herein, it should be understood that the steps of method 900 are not required to be performed in the specific sequence in which they are discussed below and, in some embodiments, the steps of the method 900 may be performed separately or simultaneously. Fewer or additional steps than are recited below may be performed within the scope of the present disclosure.

Figure 10:
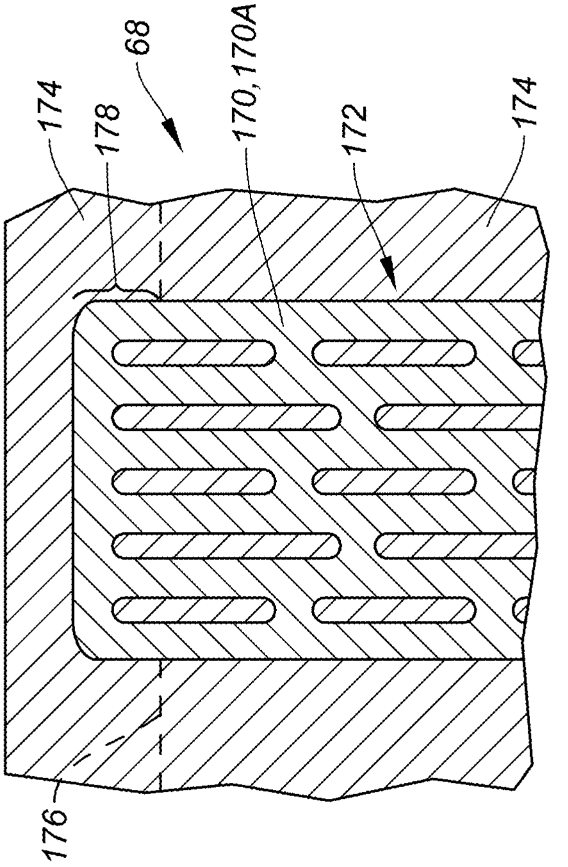
FIG. 10 illustrates a cutaway, side view of a core assembly and a casting stock during a portion of a method for forming the airfoil body, in accordance with one or more embodiments of the present disclosure.
Figure 11:
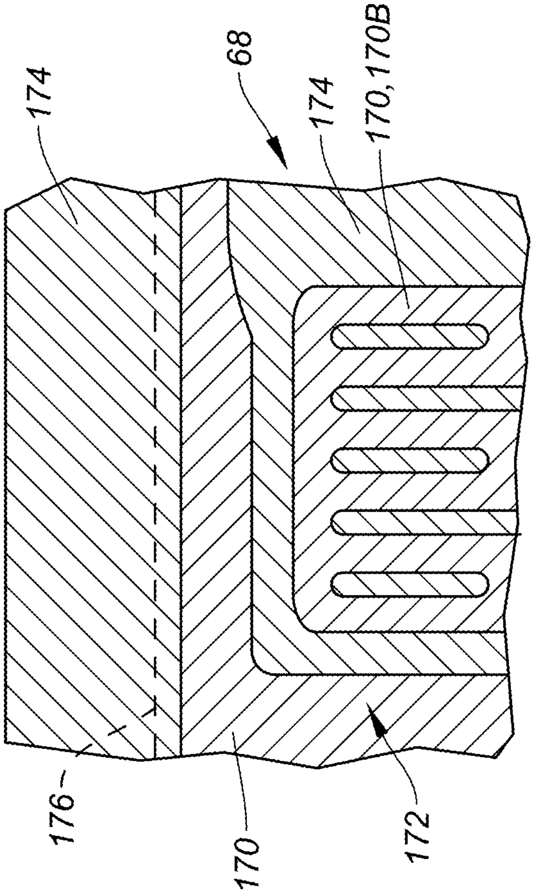
FIG. 11 illustrates another cutaway, side view of the core assembly and the casting stock during a portion of a method for forming the airfoil body, in accordance with one or more embodiments of the present disclosure.

With reference to FIGS. 10 and 11, step 902 includes forming one or more cores 170 (e.g., casting cores) configured to facilitate formation of the airfoil body 68 and the cavities and passages formed therein such as, but not limited to, the leading edge cavity 86, the main body cavities 88, the pressure side wall passages 90, the suction side wall passages 91, and the tip plenum 134. In particular, FIGS. 10 and 11 show a suction side skin core 170A and a pressure side skin core 170B for the suction side wall passages 91 and the pressure side wall passages 90, respectively. Various techniques can be used to form the cores 170, 170A-B within the scope of the present disclosure. Exemplary techniques may include core die tooling, injection molding, flexible tooling, fugitive core, lithographic tooling, and/or advanced additive manufacturing processes. Other techniques may include laser powder bed metal fusion additive manufacturing techniques such as direct metal laser sintering (DMLS) and selective laser sintering (SLS) processes. Various materials or combinations of materials may be used to form the cores 170, 170A-B such as, but not limited to, ceramics and metal and metal alloy materials (e.g., refractory metals). The cores 170, 170A-B are formed with a geometric shape corresponding to a desired counterpart geometric shape of a respective one of the airfoil body 68 cavities or passages (e.g., the leading edge cavity 86, the main body cavities 88, the pressure side wall passages 90, the suction side wall passages 91, and the tip plenum 134).

Step 904 includes assembling the cores 170, 170A-B together to form a core assembly 172 corresponding to the designed internal features (e.g., cooling cavities, passages, internal heat transfer augmentation features, cooling holes, etc.) of the airfoil body 68. For example, some or all of the cores 170, 170A-B may be coupled together to form the various internal features of the airfoil body 68. In additional to the cores 170, 170A-B, the core assembly 172 may further include pins, standoffs, locating bumpers, or other structural elements configured to facilitate support and/or interconnection of core assembly 172 components (e.g., the cores 170, 170A-B) and/or formation of additional internal features such as, but not limited to, cooling holes and other passages. The core assembly 172 may be situated in a mold. The core assembly 172 may be coated with a wax material to establish a predetermined component geometry (e.g., for an investment casting process). The wax material may be coated with another material such as a metallic or ceramic slurry that can be hardened into a shell.

Step 906 includes forming the airfoil body 68 around the core assembly 172. The airfoil body 68 may be formed around the core assembly 172 using an investment casting technique or another suitable casting technique conventionally known in the art. For example, a casting stock 174 may be applied to the core assembly 172 to form the airfoil body 68. The casting stock 174 may be cast into a mold and/or shell containing the core assembly 172. The casting stock 174 may include various materials which may be used to form the airfoil body 68 including metal or metal alloy materials such as, but not limited to, high-temperature nickel-based alloys. The deposited casting stock 174 may solidify to form the airfoil body 68 surrounding the core assembly 172. As shown in FIGS. 10 and 11, the deposited and solidified casting stock 174 may extend past a position corresponding to a machined blade tip surface location 176 of the airfoil body 68. The suction side skin core 170A also extends past the machined blade tip surface location 176 such that a top portion 178 of the suction side skin core 170A is disposed outside of the casting stock 174 which will form the airfoil body 68. Other cores 170 of the core assembly 172, such as those forming the leading edge cavity 86, the main body cavities 88, and/or the pressure side wall passages 90, may additionally or alternatively extend past the machined blade tip surface location 176 such that top portions of the cores 170 may be disposed outside of the casting stock 174 which will form the airfoil body 68, similar to the suction side skin core 170A.

Step 908 includes machining the casting stock 174 to further form the airfoil body 68. The casting stock 174 is machined to form the blade tip 70 (see FIGS. 5-8) along the machined blade tip surface location 176. The top portion 178 of the suction side skin core 170A extends outside of the airfoil body 68 at the formed blade tip 70. This top portion 178 may facilitate handling of the airfoil body 68 during machining, grinding, coating, hole drilling, or other finishing operations by permitting the airfoil body 68 to be supported (e.g., fixed) at the top portion 178. Step 908 further includes machining the blade tip 70 to form the tip pocket 144 and the squealer pocket 160. Machining portions of the casting stock 174 to form the airfoil body 68, such as the blade tip 70, the tip pocket 144, and/or the squealer pocket 160, may include application of an electrical discharge machining (EDM) technique; however, the present disclosure is not limited to any particular machining technique. Other finishing operations such as, but not limited to, heat treatments, laser drilling (e.g., cooling holes), electrical discharge machining (EDM), depositing coatings (e.g., thermal barrier coatings (TBCs) onto internal and/or external surfaces of the airfoil body 68, or the like may additionally be performed.

Step 910 includes removing the core assembly 172 from the airfoil body 68. The cores 170, 170A-B may be leached out of or otherwise removed from the airfoil body 68. The suction side wall passages 91 extending through the blade tip 70 may facilitate improved leaching (e.g., chemical leaching) of the cores 170, 170A-B from the airfoil body 68.

Figure 12:
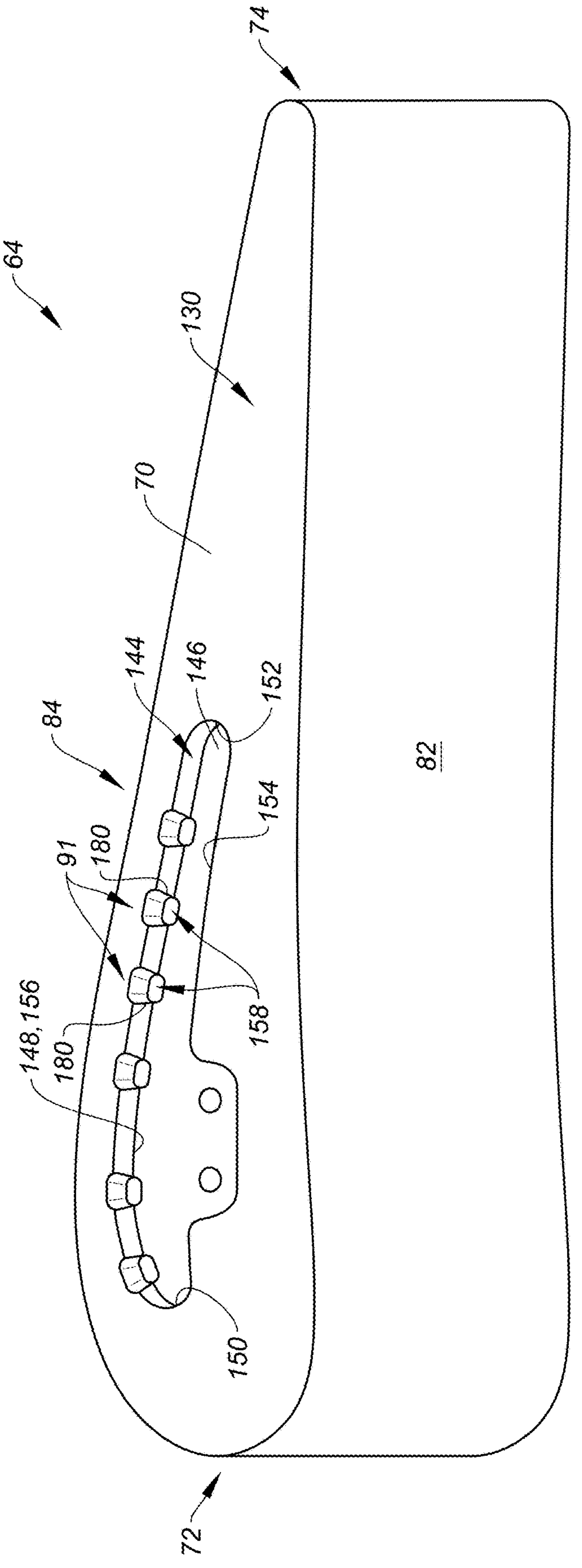
FIG. 12 illustrates a perspective view of the blade tip of another turbine blade, in accordance with one or more embodiments of the present disclosure.

Referring to FIG. 12, in some embodiments, the tip end wall 130 may form the outlet 158 of one or more of the suction side wall passages 91 with a divergent outlet (e.g., a diffusing) segment 180 at (e.g., on, adjacent, or proximate) the blade tip 70. The divergent outlet segment 180 may be characterized by an area of the outlet 158 which increases in a direction from the bottom wall 146 to the blade tip 70. This divergent outlet segment 180 may be formed by the tip end wall 130 along the suction side 156 of the perimeter side wall 148 as shown, for example, in FIG. 12. The divergent outlet segment 180 may facilitate improved air-cooling coverage of the tip end wall 130 along the blade tip 70. The divergent outlet segment 180 may be recessed into the suction side 156, for example, by at least between 0.5-1 diameter and/or height of the divergent outlet segment 180. The divergent outlet segment 180 may be formed by both the bottom wall 146 and the suction side 156. The divergent outlet segment 180 may be of cylindrical, racetrack, elliptical, slot shapes, or other geometry shapes conducive to maximize the film effectiveness and cooling flow distribution along the suction side 156. The quantity and hole-to-hole spacing of the divergent outlet segment 180 along the suction side 156 may vary and range in spacing between one (1) to six (6) hydraulic diameters (Dh) of the divergent outlet segment 180 cross sectional area and/or perimeter. The divergent angles of the outlet may range between zero degrees (0°) and fifteen degrees (15°) relative to a centerline of the divergent outlet segment 180. The divergent angles may be symmetrical or non-symmetrical depending on the local pressure gradients and flow field characteristics.

Figure 13B:
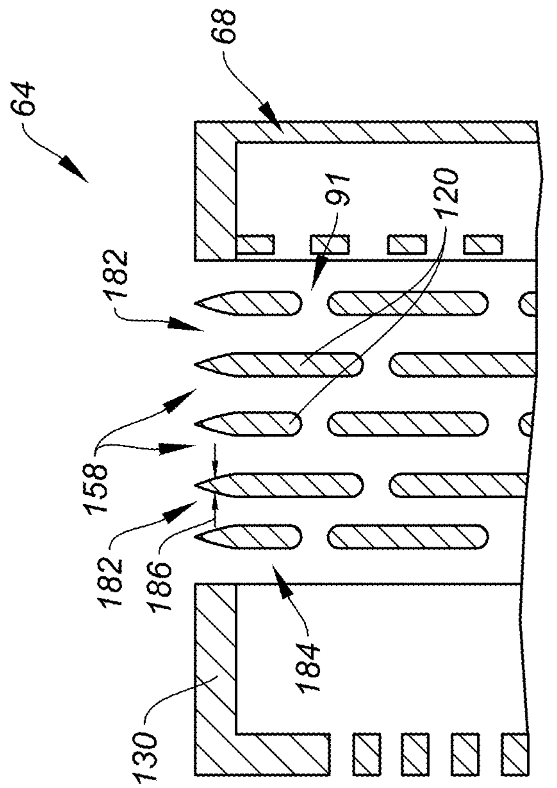
FIGS. 13A-B illustrate cutaway, side views of other turbine blades, in accordance with one or more embodiments of the present disclosure.
Figure 13A:
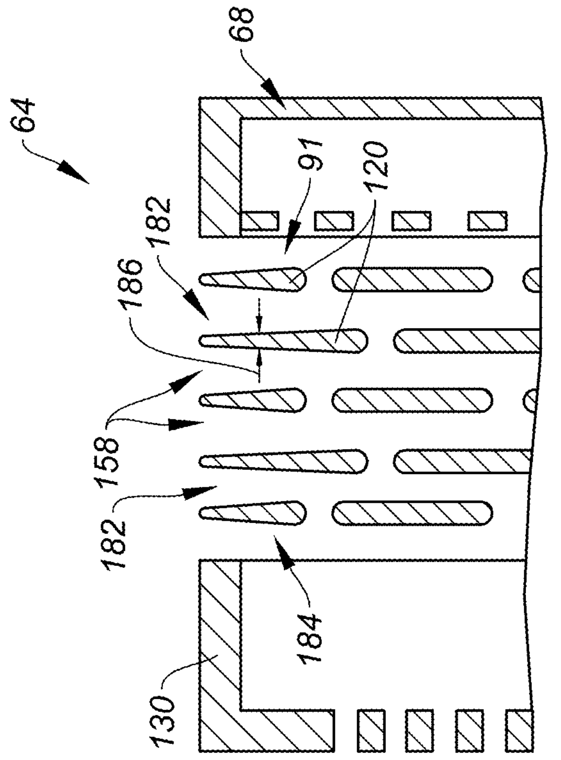

Referring to FIGS. 13A-B, in some embodiments, the airfoil body 68 may form one or more of the suction side wall passages 91 with a divergent passage geometry 182 upstream (e.g., immediately upstream) of the outlet 158 of the respective one or more of the suction side wall passages 91 to facilitate improved air-cooling coverage of the tip end wall 130, for example, at (e.g., on, adjacent, or proximate) the tip pocket 144 (see FIG. 8). The divergent passage geometry 182 may be formed by the exterior wall segment 116, the interior wall segment 118, and/or the ribs 120 (see FIG. 7). For example, an outer radial subset 184 of the ribs 120 at (e.g., on, adjacent, or proximate) the tip end wall 130 may have a thickness 186 which decreases in an inner to outer radial direction to form the divergent passage geometry 182. The ribs 120 of the outer radial subset 184 may have a teardrop shape (see FIG. 13A), a conical cross-sectional shape (see FIG. 13B), or another suitable shape forming the divergent passage geometry 182 of one or more of the suction side wall passages 91. The divergent passage geometry 182 may be recessed into the suction side wall 78 (e.g., the exterior wall segment 116 and/or the interior wall segment 118) by at least between 0.5-1 diameter and/or height of a minimum metering cross sectional shape of the suction side wall passages 91 at the divergent passage geometry 182 (e.g., formed between each of the teardrop or conical features). This minimum metering cross sectional flow area may be further formed by both the bottom wall 146 and the suction side 156 at the divergent outlet segment 180. The divergent passage geometry 182 may be of cylindrical, racetrack, elliptical, slot shapes, or other geometry shapes conducive to maximizing the film effectiveness and cooling flow distribution along the suction side 156. The quantity and spacing of the minimum metering cross sectional flow area along the suction side 156 may vary and range in spacing between one (1) to six (6) hydraulic diameters (Dh) of the outlet cross sectional area and perimeter of the respective one of the suction side wall passage 91 at the divergent passage geometry 182. While FIGS. 13A and 13B, illustrate the teardrop and conical divergent passage geometry 182 shapes in a predominately radial direction outward toward the blade tip 70, the divergent passage geometry 182 shapes are not limited to this particular orientation and may alternatively be skewed, canted, fanned, or otherwise arranged to more efficiently facilitate cooling of the blade tip 70.

Figure 14B:
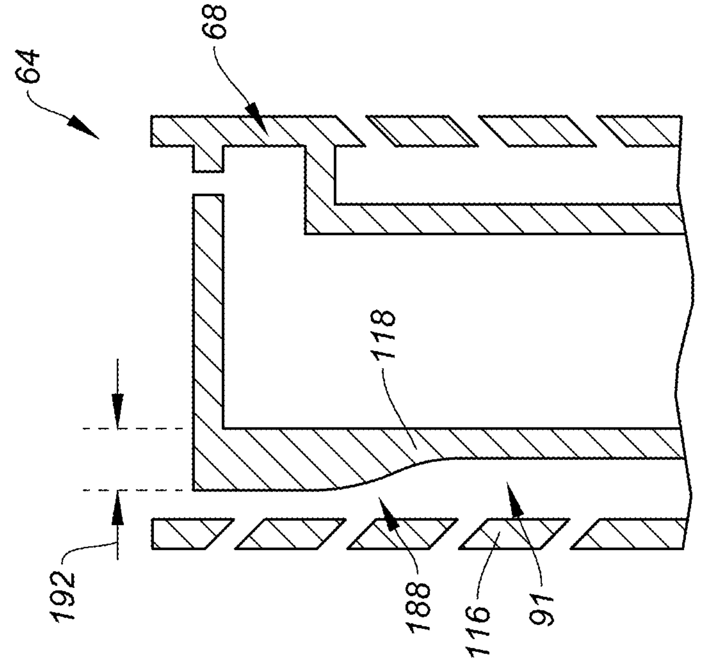
FIGS. 14A-B illustrate cutaway, side views of other turbine blades, in accordance with one or more embodiments of the present disclosure.
Figure 14A:
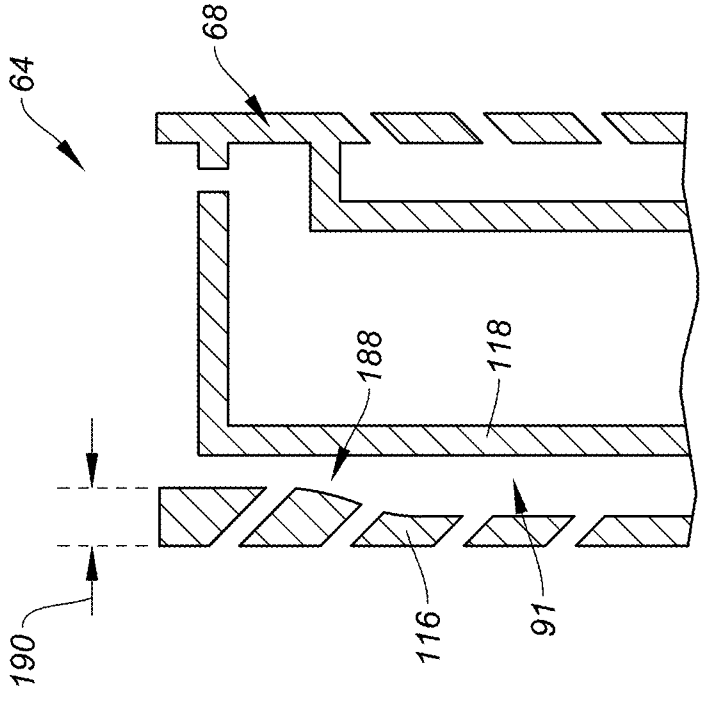

Referring to FIGS. 14A-B, in some embodiments, the airfoil body 68 may form one or more of the suction side wall passages 91 with a convergent passage geometry 188 upstream (e.g., immediately upstream) of the outlet 158 of the respective one or more of the suction side wall passages 91. The convergent passage geometry 188 may be formed by and between the exterior wall segment 116 and the interior wall segment 118 as shown, for example, in FIGS. 14A-B. This convergent passage geometry 188 may be formed in combination with the divergent passage geometry 182 described above (e.g., formed by the ribs 120); however, the present disclosure is not limited to this foregoing exemplary configuration of the suction side wall passages 91. The convergent passage geometry 188 may be characterized by a change in thickness of the exterior wall segment 116 and/or the interior wall segment 118 at (e.g., on, adjacent, or proximate) the tip end wall 130. As shown in FIG. 14A, for example, a thickness 190 of the exterior wall segment 116 may increase in an inner to outer radial direction coincident with the convergent passage geometry 188. As shown in FIG. 14B, for example, a thickness 192 of the interior wall segment 118 may increase in an inner to outer radial direction coincident with the convergent passage geometry 188.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. A blade for a gas turbine engine, the blade comprising:
an airfoil body configured for rotation about a rotational axis of the gas turbine engine, the airfoil body including a pressure side wall, a suction side wall, and a tip end wall, the pressure side wall and the suction side wall extending between and to a leading edge of the airfoil body and a trailing edge of the airfoil body, the pressure side wall forming a pressure side surface, the suction side wall forming a suction side surface, the tip end wall forming a blade tip at an outer radial body end of the airfoil body, the airfoil body forming a plurality of suction side wall passages and a main body cavity,
the suction side wall including an exterior wall segment and an interior wall segment, the suction side wall forming the plurality of suction side wall passages between the exterior wall segment and the interior wall segment, the interior wall segment and the exterior wall segment extending radially to and contacting the tip end wall, the plurality of suction side wall passages extending through the tip end wall to the blade tip, and a plurality of radially oriented segmented ribs extending within the plurality of suction side wall passages through the tip end wall to the blade tip, and
the interior wall segment and the pressure side wall forming the main body cavity.

2. The blade of claim 1, wherein the main body cavity is isolated from fluid communication with the suction side wall passages.

3. The blade of claim 1, wherein the tip end wall forms a tip pocket on the blade tip, and the plurality of suction side wall passages are connected in fluid communication with the tip pocket.

4. The blade of claim 3, wherein the tip end wall forms a bottom wall and a perimeter side wall forming the tip pocket, the bottom wall is disposed radially inward of the blade tip, the perimeter side wall extends between and to the bottom wall and the blade tip, and the plurality of suction side wall passages are formed through the bottom wall.

5. The blade of claim 4, wherein the plurality of suction side wall passages are further formed through the perimeter side wall.

6. The blade of claim 3, wherein the pressure side wall, the interior wall segment, and the tip end wall form a tip plenum extending along the tip end wall, and the tip plenum is disposed radially outward of and connected in fluid communication with the main body cavity.

7. The blade of claim 6, wherein the tip end wall forms a squealer pocket on the blade tip, and the squealer pocket is connected in fluid communication with the tip plenum.

8. The blade of claim 7, wherein the squealer pocket is disposed coincident with the tip pocket.

9. The blade of claim 6, wherein the tip plenum extends along the tip end wall to an outlet formed through the trailing edge.

10. The blade of claim 6, wherein the pressure side wall includes an exterior pressure wall segment and an interior pressure wall segment, the pressure side wall forms a plurality of pressure side wall passages between the exterior pressure wall segment and the interior pressure wall segment, the tip plenum is separated from the pressure side wall passages by the interior pressure wall segment, and the tip plenum is disposed radially outward of the pressure side wall passages.

11. The blade of claim 1, wherein the exterior wall segment forms a plurality of cooling holes extending through exterior wall segment from the suction side wall passages to the suction side surface.

12. A gas turbine engine comprising:

a turbine section including a bladed turbine rotor mounted for rotation about a rotational axis, the bladed turbine rotor including a plurality of turbine blades, each of the turbine blades including an airfoil body, the airfoil body including a pressure side wall, a suction side wall, and a tip end wall, the pressure side wall and the suction side wall extending between and to a leading edge of the airfoil body and a trailing edge of the airfoil body, the pressure side wall forming a pressure side surface, the suction side wall forming a suction side surface, the tip end wall forming a blade tip at an outer radial body end of the airfoil body, the airfoil body forming a plurality of suction side wall passages, a plurality of pressure side wall passages, and a tip plenum, the suction side wall including an exterior suction wall segment and an interior suction wall segment, the suction side wall forming the plurality of suction side wall passages between the exterior suction wall segment and the interior suction wall segment, the interior suction wall segment and the exterior suction wall segment extending radially to and contacting the tip end wall, the plurality of suction side wall passages extending through the tip end wall to the blade tip, the pressure side wall including an exterior pressure wall segment and an interior pressure wall segment, the pressure side wall forming the plurality of pressure side wall passages between the exterior pressure wall segment and the interior pressure wall segment, the interior pressure wall segment forming an outer radial passage end of the plurality of pressure side wall passages radially inward of the blade tip, and the pressure side wall, the suction side wall, and the tip end wall forming the tip plenum extending along the tip end wall, the tip plenum disposed radially between the plurality of pressure side wall passages and the tip end wall;

wherein the tip end wall forms a tip pocket on the blade tip, and the plurality of suction side wall passages are connected in fluid communication with the tip pocket;

wherein the tip end wall forms a bottom wall and a perimeter side wall forming the tip pocket, the bottom wall is disposed radially inward of the blade tip, the perimeter side wall extends between and to the bottom wall and the blade tip, and the plurality of suction side wall passages are formed through the bottom wall; and wherein the plurality of suction side wall passages are further formed through the perimeter side wall.

13. The gas turbine engine of claim 12, wherein the tip end wall forms a squealer pocket on the blade tip, and the squealer pocket is connected in fluid communication with the tip plenum.

14. A blade for a gas turbine engine, the blade comprising:

an airfoil body configured for rotation about a rotational axis of the gas turbine engine, the airfoil body including a pressure side wall, a suction side wall, and a tip end wall, the pressure side wall and the suction side wall extending between and to a leading edge of the airfoil body and a trailing edge of the airfoil body, the pressure side wall forming a pressure side surface, the suction side wall forming a suction side surface, the tip end wall forming a blade tip at an outer radial body end of the airfoil body, the airfoil body forming a plurality of suction side wall passages and a main body cavity, the suction side wall including an exterior wall segment and an interior wall segment, the suction side wall forming the plurality of suction side wall passages between the exterior wall segment and the interior wall segment, the interior wall segment and the exterior wall segment extending radially to and contacting the tip end wall, the plurality of suction side wall passages extending through the tip end wall to the blade tip, and the interior wall segment and the pressure side wall forming the main body cavity;

wherein the tip end wall forms a bottom wall and a perimeter side wall, the bottom wall and the perimeter wall forming a tip pocket on the blade tip, the bottom wall disposed radially inward of the blade tip, the perimeter side wall extending between and to the bottom wall and the blade tip, the plurality of suction side wall passages formed through the bottom wall; and wherein the plurality of suction side wall passages are connected in fluid communication with the tip pocket, and the plurality of suction side wall passages are further formed through the perimeter side wall.

* * * * *